United States Patent [19]
Cooper

[11] 3,789,261
[45] Jan. 29, 1974

[54] RADAR SWEEP GENERATOR

[75] Inventor: George P. Cooper, Corona Del Mar, Calif.

[73] Assignee: North American Rockwell Corporation, Anaheim, Calif.

[22] Filed: Apr. 6, 1972

[21] Appl. No.: 241,619

[52] U.S. Cl.............................. 315/27 TD, 315/23
[51] Int. Cl........................................... H01j 29/70
[58] Field of Search... 315/27 TD, 27 R, 26, 28, 29, 315/23, 22, 19, 18

[56] References Cited
UNITED STATES PATENTS
| | | | |
|---|---|---|---|
| 3,440,485 | 4/1969 | Nix, Jr. et al. | 315/27 R |
| 3,179,843 | 4/1965 | Schwartz | 315/27 R |
| 3,467,882 | 9/1969 | Young | 315/27 TD |

Primary Examiner—Maynard R. Wilbur
Assistant Examiner—J. M. Potenza
Attorney, Agent, or Firm—L. Lee Humphries; H. Fredrick Hamann; Rolf M. Pitts

[57] ABSTRACT

A sweep generator for a displaced-center sector-scan display of a radar system, in which the inductance of the cathode ray tube display device cooperates with a storage capacitor for directly generating a bipolar sweep current waveform utilized by the control yoke. A centering gate responsive to the radar timing, energizes the winding to start the sweep from a filter capacitor of the power supply. During a first polarity portion of the sweep the energized winding is storingly discharged into the capacitor and during the oppositely-polarized second portion of the sweep, a sweep gate allows discharge of the capacitor back into the winding. The winding energy is then discharged at the end of the sweep back into the filter capacitor of the power supply, whereby a very low-power source may be utilized for energizing the sweep generator.

11 Claims, 4 Drawing Figures

RADAR SWEEP GENERATOR

RELATED COPENDING APPLICATIONS

1. U.S. application Ser. No. 223,651 filed approximately Feb. 4, 1972 by George P. Cooper for "Radar Modulator."
2. U.S. application Ser. No. (unknown) filed approximately Mar. 13, 1972 by George P. Cooper et al. for "Magnetic Deflection System for Depressed-Center Sector Scan Display."

BACKGROUND OF THE INVENTION

The technological field to which the subject invention relates is electronic sweep generators for driving a range sweep input of a cathode ray tube type radar system display device.

In the prior art of display devices for radar systems, the range trace sweep voltage has been provided by a separate sweep voltage generation system which is fed into a Class A voltage-to-current feedback amplifier. Such conventional design approach requires high power for several reasons. First, energy is required to drive the voltage generation system and to excite the Class A amplifier. Secondly, the power used to energize the deflection winding of the cathode ray tube deflection yoke is dumped at the end of the sweep cycle into a resistive (energy-dissipating) load.

Further, such conventional design approach is uneconomical in requiring a separate voltage waveform generator and Class A amplifier, in addition to a power supply of substantial power rating.

BRIEF DESCRIPTION OF THE INVENTION

By means of the concept of the subject invention, the above-noted shortcomings of the prior art are avoided and there is provided gating means cooperating with a control winding of a deflection yoke and a storage capacitor for directly effecting sweep control of the deflection yoke.

In a preferred embodiment of the invention, there is provided a cathode ray tube having a deflection yoke with at least one control winding and also a storage capacitor. There is also provided first means for preselectively unipolarly charging the winding from a filtered powered supply and then discharging the winding into the capacitor. There is further provided second means for discharging the capacitor through the winding and then discharging the recharged winding into a filter capacitor of the filtered power supply.

In normal operation of the above-described arrangement, the initial energy state of the energized deflection control winding cooperates with the storage capacitor to generate a first preselectively polarized portion of the sweep cycle, the capacitor storing such energy for transfer back to the discharge winding during an oppositely polarized remaining portion of the sweep cycle. The energy of the recharged winding is then restored to the filter capacitor of the power supply.

By means of such arrangement, the necessity of a separate sweep generator and Class A amplifier for sweep excitation of the deflection yoke is avoided. Also, such design economy allows a corresponding design economy in the power rating of the power supply. Further, because of the double-energy transfer by means of the non-dissipative transfer of energy between the deflection winding and the storage capacitor and between the deflection winding and the filter capacitor of the power supply, the power supply is only required to make up resistive losses and magnetic losses, whereby a further design economy may be made in the power and voltage ratings of the power supply.

Accordingly, an object of the invention is to provide an improved sweep generator system for a radar system display.

Another objective of the invention is to provide a radar display system sweep generator that is simple and inexpensive to manufacture.

A further object is to provide a simple sweep generator for which the sweep interval thereof may be widely adjustable while the centering position is maintained substantially constant.

Still another object is to provide a sweep generator with a precise, gated sweep start time which may easily be synchronized with a radar transmitter pulse.

These and other objects of the invention will become apparent from the following description, taken together with the accompanying drawings, in which:

BRIEF DESCRIPTION OF THE DRAWINGS

In the figures, like characters refer to like parts.

DESCRIPTION OF THE PREFERRED EMBODIMENTS

Figure 1:
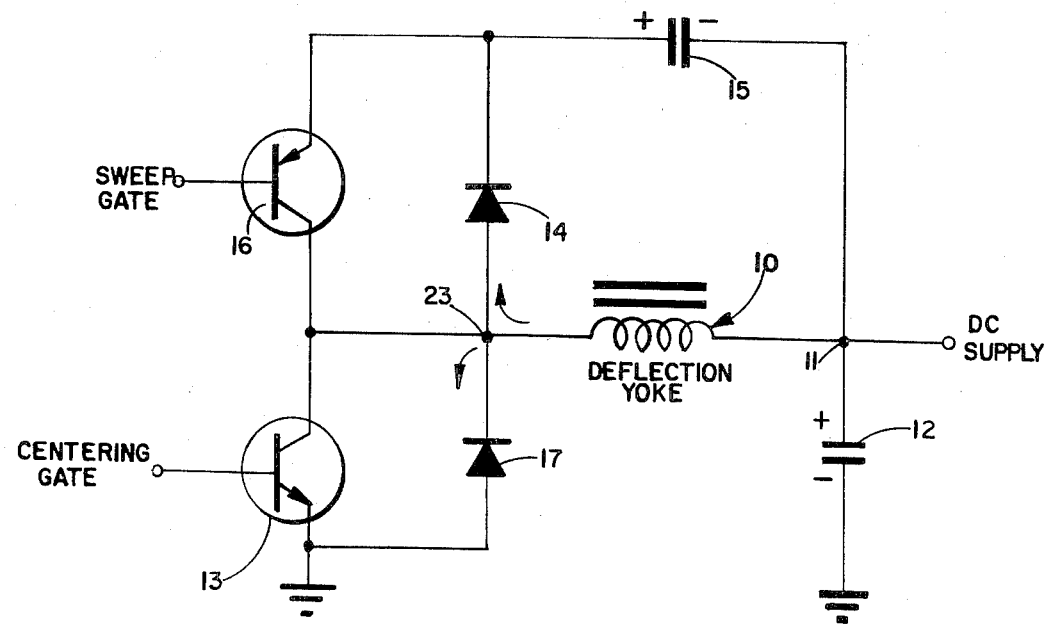
FIG. 1 is a schematic diagram of a sweep generator system embodying a concept of the invention.

Referring now to FIG. 1, there is illustrated a schematic diagram of a sweep generator system embodying a concept of the invention. There is provided a deflection control winding 10 of a deflection yoke of a cathode ray tube type display indicator, as may be employed as a displaced-center sector-scan display device for a radar system, a first terminal 11 of which winding is coupled to the filtered output of a d-c power supply (not shown), the output shunt filter capacitor of which is shown as element 12. There is also provided a centering gate comprising a transistor 13 for unipolarly (conductively) coupling a second terminal 23 of winding 10 to a common or ground terminal of the power supply during a preselected centering interval. A centering diode 14 couples winding 10 in series with a storage capacitor 15 during a first preselectively polarized portion of a bipolar sweep cycle, whereby energy is discharged from winding 10 and stored in capacitor 15. In other words, the energy in winding 10 is thus storingly discharged therefrom. There is further provided a sweep gate 16, shunt-connected across and oppositely polarized relative to diode 14, for interconnecting winding 10 and capacitor 15 during an oppositely polarized second portion of the bipolar sweep cycle, whereby the charge stored in capacitor 15 is discharged into winding 10. A sweep diode 17, shunted across and oppositely polarized relative to unipolar gate 13, allows re-energized winding 10 to discharge into filter capacitor 12 of the power supply during a recovery interval subsequent to the bipolar sweep interval.

In the application of the device of FIG. 1 to a depressed center sector scan display for a radar system, the vertical deflection control winding of the cathode ray tube deflection yoke is initially biased or energized so that the electron beam is initially depressed or offset to an edge of the tube face, and the beam subsequently swept upward or across the face of the tube, as one of a number of radial lines whose common origin or center is the initial depressed or offset position.

Angular deflection or control of the radial lines to effect a sector scan, while employing a layer area of the face of the display tube, is described more fully in copending application Ser. No. (unknown) field for "Magnetic Deflection System for Depressed-Center Sector Scan Display" by George P. Cooper et al., assignors to North American Rockwell Corporation, assignee of the subject invention. By means of the concept of such copending application, the (range) sweep signal needs drive only one deflection control winding, as to allow design economies in the sweep generator power supply for the device of FIG. 1.

In the application of the device of FIG. 1 to a B-Scan display for a radar system, the biasing is the same as described above, however the orthogonal winding of the deflection yoke has a superimposed current applied to deflect the vertical sweep horizontally across the CRT in synchronizism with the antenna scan.

Figure 2:
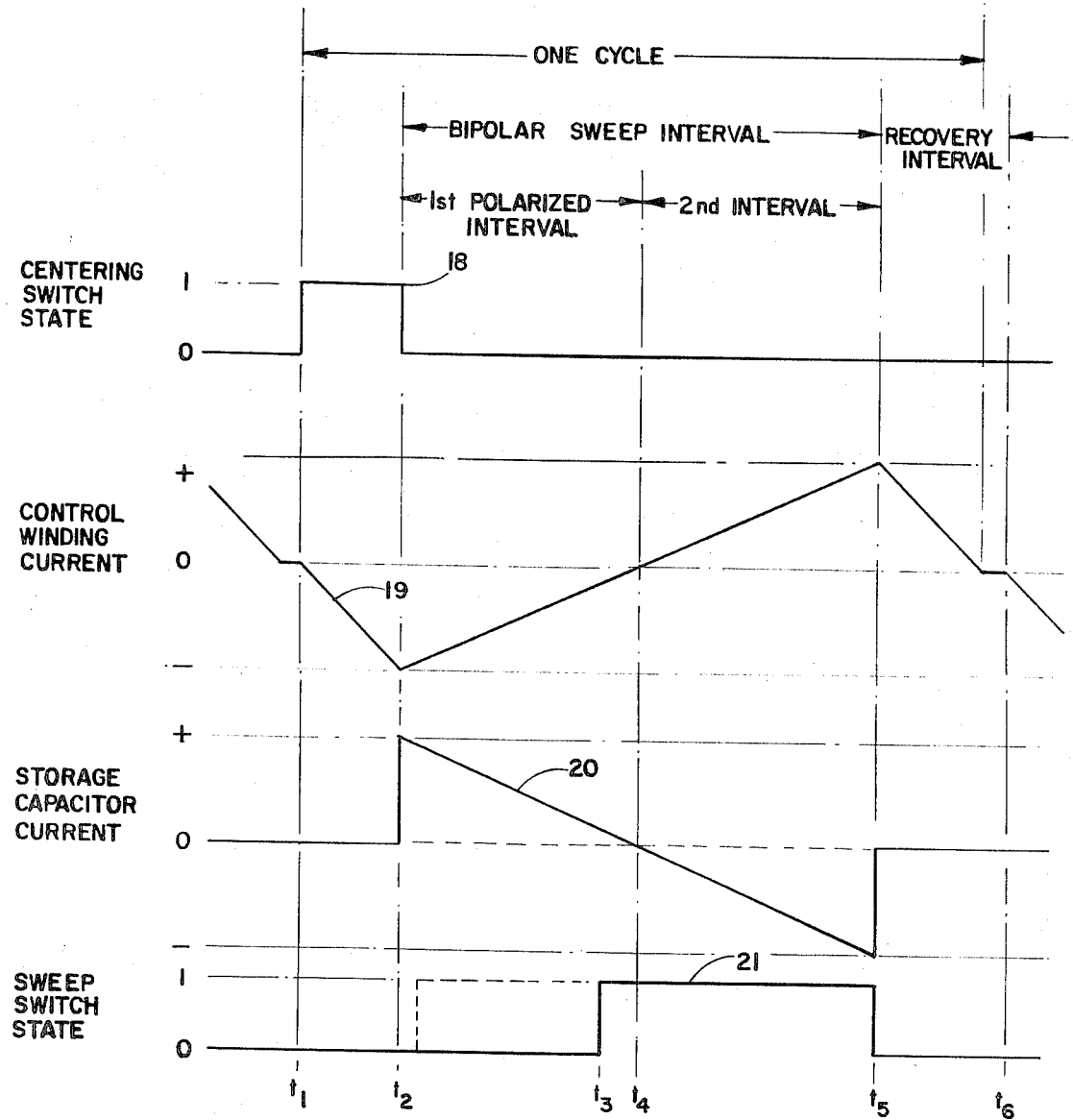
FIG. 2 is a family of time histories of the responses of several components of the device of FIG. 1.

The operation of the device of FIG. 2 as a (range) sweep generator for a depressed-center sector-scan display may be further appreciated from FIG. 2.

Referring to FIG. 2, there is illustrated a family of time histories of the responses of several elements of the device of FIG. 1. Curve 18 represents the two-state (off/on) response of centering gate 13; curve 19 represents the current waveform or response of control winding 10; curve 20 represents the current waveform response of capacitor 15; and curve 21 represents the two-state (off/on) response of sweep gate 16.

In an exemplary application of the sweep generator system of FIG. 1 to a depressed center sector radar display device, the centering switch is turned-on (curve 18 at $t_1$ in FIG. 2), say, approximately 25 microseconds before the desired initiation of the sweep. Such exemplary 25 microsecond interval ($t_1$ to $t_2$ in FIG. 2) corresponds to a charging interval, during which winding 10 is energized by the power supply filter capacitor 12 so as to deflect the cathode ray tube electron beam from a central position to an initial offset or depressed position (curve 19 at $t_2$ in FIG. 2). At the start of the sweep interval ($t_2$–$t_5$) centering switch 13 is opened (curve 18 at $t_2$).

The magnetic field stored in deflection winding 10 then generates a voltage and current (curve 20 from $t_2$ to $t_4$) such that capacitor 15 is charged to a positive voltage. During this period, the current through winding 10 is decreasing (curve 19 from $t_2$ to $t_4$). Sweep switch 16 must be closed (curve 21 at $t_3$) before the capacitor current gets to zero (curve 20 at $t_4$). As the capacitor current passes through zero, the circuit path is transferred from centering diode 14 to sweep switch 16; consequently, the winding current (curve 19 between $t_4$ and $t_5$) through sweep switch 16 continues to increase until the desired end of the sweep (curve 19 at $t_5$). At time $t_5$ sweep switch 16 is opened. The current through winding 10 then decreases back to zero (curve 20 at $t_6$ in FIG. 2) through sweep diode 17. During the centering interval ($t_1$ to $t_2$), energy is taken from the power supply and stored in the field of winding 10. During the time interval from the start of the sweep until the current goes through zero ($t_2$ to $t_4$), energy is transferred from the yoke field into capacitor 15. During the next time interval, from when the current crosses zero until the end of the sweep ($t_4$ to $t_5$), energy is removed from capacitor 15 and stored in the yoke field in the opposite sense from the original cycle. At the end of the sweep ($t_5$), sweep switch 16 is opened and the yoke field now generates the proper voltage and current to transfer the energy back into the power supply filter capacitor 12. In essence, power is used only to make up resistive and magnetic losses; consequently, the sweep generator of FIG. 1 may be used to generate radar sweeps for wide deflection-angle high-voltage cathode ray tubes without excessive power requirements.

The device shown in FIG. 1 operates effectively only over limited changes in sweep gate length (8 to 1 is practical, due to the reduction in charge voltage on capacitor 15 as the sweep time is increased. when this voltage is too low, the voltage drop across the yoke resistance and sweep switch transistor 16 results in excessive sweep droop. As the gate width is increased the equilibrium shifts and the voltage on capacitor 15 increases until the sweep slope ($di/dt$) is sufficiently high for a balanced sweep to occur during the new time interval. The voltage generated on capacitor 15 automatically is the correct voltage for a symmetrical sweep since a decrease in the gate width would result in both an unbalanced charge and discharge currents to capacitor 15, and also result in a new equilibrium voltage. The limit upon a minimum gate width is set by the maximum voltage capability of the components. An alternate embodiment of the sweep generator of FIG. 1 is shown in FIG. 3.

Figure 3:
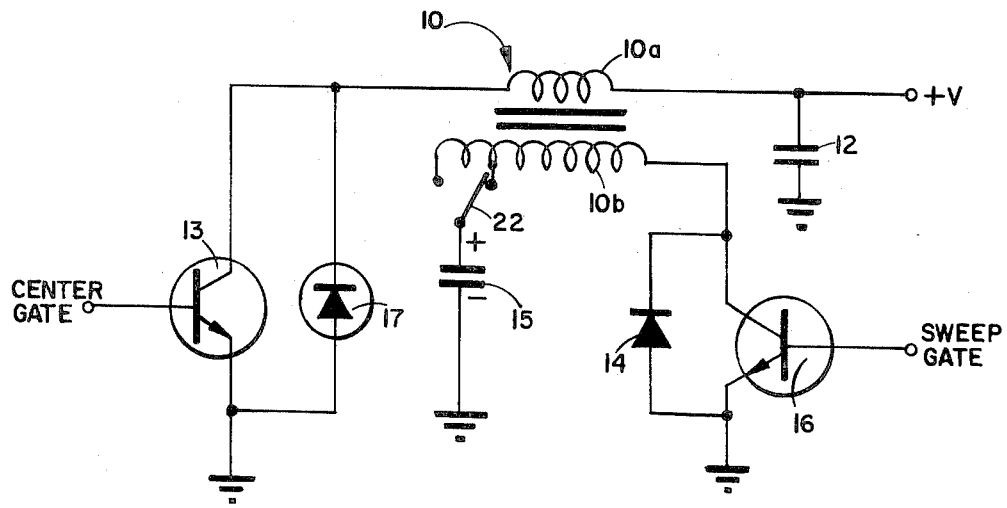
FIGS. 3 and 4 are alternate embodiments of the device of FIG. 1.

Referring to FIG. 3, there is illustrated an alternate embodiment of the device of FIG. 1 in which like types of switching transistors may be employed for gates 13 and 16. Also included in FIG. 3 is a modification to deflection control winding 10 in that a multiple or transformer winding is employed, having a primary winding 10a and a tapped secondary winding 10b, for which an adjustable turns-ratio may be provided by means of switch 22 in the circuit cooperation of capacitor 15, while centering gate 13 is connected to the primary. In this way, the sweep length may be adjusted without varying the centering interval, whereby display calibration problems are simplified in connection with sweep length changes. In other words, where the centering gate is referenced to a fixed voltage, it is easier to insert a gating signal to which a consistent time-constant of response is achieved by gate 13, even though voltage scale changes are effected at capacitor 15 by means of switch 22. Switching of the inductance 10b by means of switch 22 provides broad changes (as high as 64:1) in the range display scales, while finer changes are effected by changing the gating interval of sweep gate 16.

Figure 4:
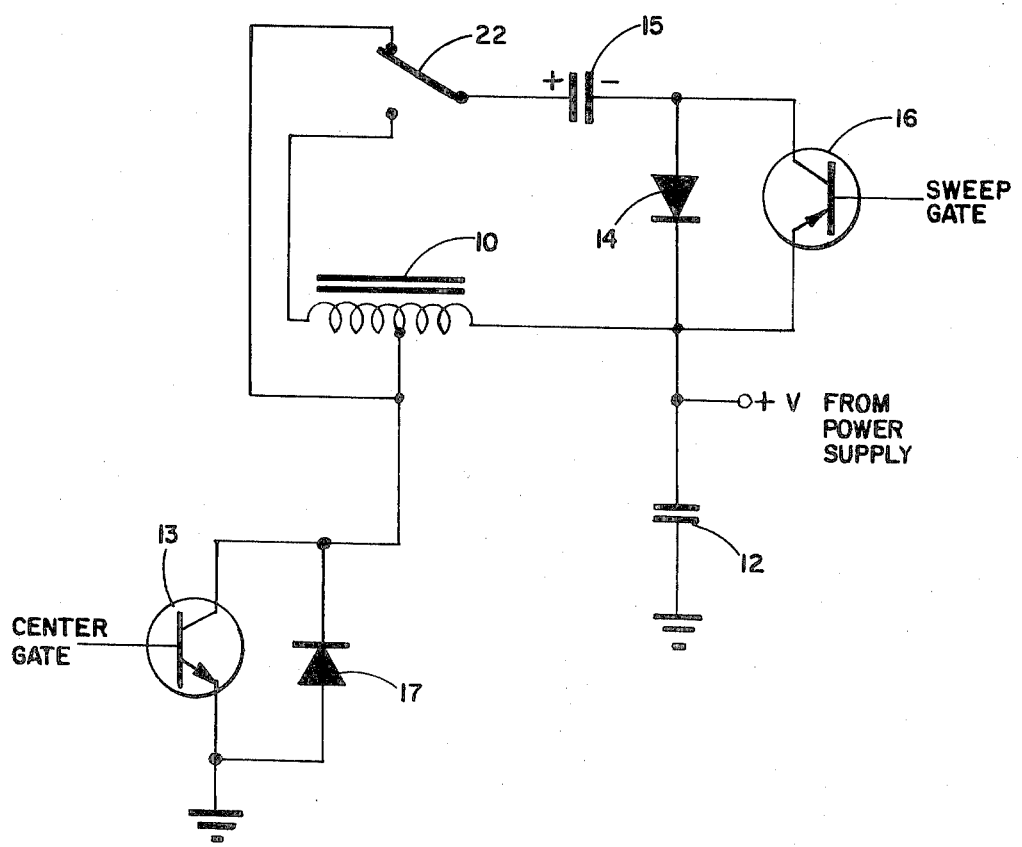

A simpler version of the adjustable sweep generator of FIG. 3 is shown in the preferred embodiment of FIG. 4 in which a tapped single winding is employed for deflection control coil 10 in the manner of an auto transformer (in lieu of the double winding of FIG. 3), while complementary transistors are employed for gates 13 and 16, similarly as the gates utilized in the embodiment of FIG. 1.

Thus, in the off-center sector scan, or B-Scan, display system in which the subject scan generator is to be employed, the deflection winding itself is a part of the sweep generator circuit. Further, a double energy storage and transfer is employed between the deflection winding and the integrating capacitor and the power supply filter capacitor, to effect further design economies in the design of the sweep generator and the associated power supply therefor. Moreover, substantial variations in sweep length may be conveniently obtained without associated calibration problems. Accordingly, an improved sweep generator system has been described.

Although the sweep generator of the invention has been described in terms of its utility in a unique depressed-center sector scan display, it is not so limited and may be employed in any circuit application where a variable $di/dt$ slope generator with a fixed, known starting voltage point is desired.

Althouth the invention has been described and illustrated in detail, it is to be clearly understood that the same is by way of illustration and example only and is not to be taken by way of limitation, the spirit and scope of this invention being limited only by the terms of the appended claims.

I claim:

1. A sweep generator system having a storage capacitor and providing a double energy transfer in a bipolar sweep cycle for charging and discharging a deflection control winding and comprising first means for preselectively unipolarly charging said winding and then discharging said winding into said capacitor and including
 a first unipolar gate for unipolarly gating-on a power supply to said winding for a preselected first charging and centering interval, and
 a first diode similarly poled as said gate for discharging the energy of said charged winding into said capacitor during a first unipolar portion of a sweep interval;

second means for discharging said capacitor through said winding and then storingly discharging said winding and including
 a second unipolar gate for unipolarly gating-on said discharging capacitor to said winding during a second unipolar portion of a sweep interval, and
 a second diode similarly poled as said gate for discharging said winding into a filter capacitor of a power supply of said system during a recovery interval.

2. A sweep voltage generator for a depressed center sector scan radar display system or a B-Scan radar display system and having a storage capacitor and comprising in combination:

a centering gate for unipolarly coupling a deflection control winding of a cathode ray tube deflection yoke of said display system for a limited centering interval in series with a power supply system having a filter capacitor shunted across the output thereof;

a charging diode similarly poled as said centering gate for unipolarly coupling said control winding and said storage capacitor in series circuit for storingly discharging the energy of said deflection yoke during a first unipolar portion of a bipolar sweep cycle of said control winding;

a sweep gate shunted across said charging diode and oppositely poled relative thereto for unipolarly coupling said storage capacitor and said control winding for discharge of said storage capacitor through said control winding during a second unipolar portion of said sweep cycle and oppositely poled relative to said first portion; and a sweep diode shunted across said centering gate and oppositely poled relative thereto for transferring the sweep energy of said second portion of said sweep cycle to a filter capacitor of a power supply of said system.

3. The device of claim 2 in which said deflection control winding is transformer-wound, having a primary winding and a tapped secondary winding, the storage capacitor being connected between a common ground terminal and selected tap of one end of said tapped secondary winding, the centering gate and oppositely poled sweep diode being mutually shunt connected and interconnecting a first terminal of said secondary winding and said common ground terminal, a second terminal of said primary winding being adapted to be connected to a filtered power supply;

said sweep gate and oppositely poled charging diode being mutually shunt connected and interconnecting a second end of said tapped secondary winding and said common ground terminal, said gates being unipolarly conductive and likepoled.

4. The device of claim 2 in which there is provided means for adjusting the sweep interval without varying the centering interval of said generator.

5. The device of claim 2 in which there is provided means for adjusting the sweep interval without varying the centering interval of said generator and comprising taps on said deflection control winding,
said storage capacitor being selectively connected to a selected one of said taps of said deflection control winding.

6. The device of claim 2 in which there is provided means for adjusting the sweep interval without varying the centering interval of said generator and comprising said deflection winding wound as a transformer having a primary winding and a tapped secondary winding,
said storage capacitor being selectively connected to a selected one of said taps of said deflection winding.

7. The device of claim 2 in which said deflection control winding is tapped, a first end terminal and an intermediate tap terminal thereof being connected to a respective first and second switch terminals of a double-throw switch, the armature of said switch being connected in series with said storage capacitor.

8. A sweep voltage generator for a depressed center sector scan or B-scan radar display system and having a power supply with an output shunt filter capacitor and comprising in combination storage capacitor,
a deflection control winding of a cathode ray tube deflection yoke of said display system,
a centering gate for unipolarly coupling said control winding for a limited centering interval in closed circuit with said filter capacitor,
a charging diode similarly poled as said centering gate for unipolarly coupling said control winding and said storage capacitor in series circuit for storingly discharging the energy of said control winding during a first unipolar portion of a bipolar sweep cycle of said control winding, a sweep gate shunted across said charging diode and oppositely poled relative thereto for unipolarly coupling said storage capacitor and said control winding for discharge of said storage capacitor through said control winding during a second unipolar portion of said sweep cycle and oppositely poled relative to said first portion, and a sweep diode shunted across said centering gate and oppositely poled relative thereto for transferring the sweep energy of said second portion of said sweep cycle to a filter capacitor of a power supply of said system.

9. The device of claim 8 in which there is provided means for adjusting the sweep interval without varying the centering interval of said generator.

10. The device of claim 8 in which there is provided means for adjusting the sweep interval without varying the centering interval of said generator and comprising taps on said deflection control winding, said storage capacitor being selectively connected to a selected one of said taps of said deflection control winding.

11. The device of claim 8 in which said deflection control winding is tapped, a first end terminal and an intermediate tap terminal thereof being connected to a respective first and second switch terminals of a double-throw switch, the armature of said switch being connected in series with said storage capacitor.

* * * * *